Jan. 10, 1956    R. S. HUESTED    2,730,398
AIR LIFT DEVICES
Filed Oct. 24, 1951    2 Sheets-Sheet 1
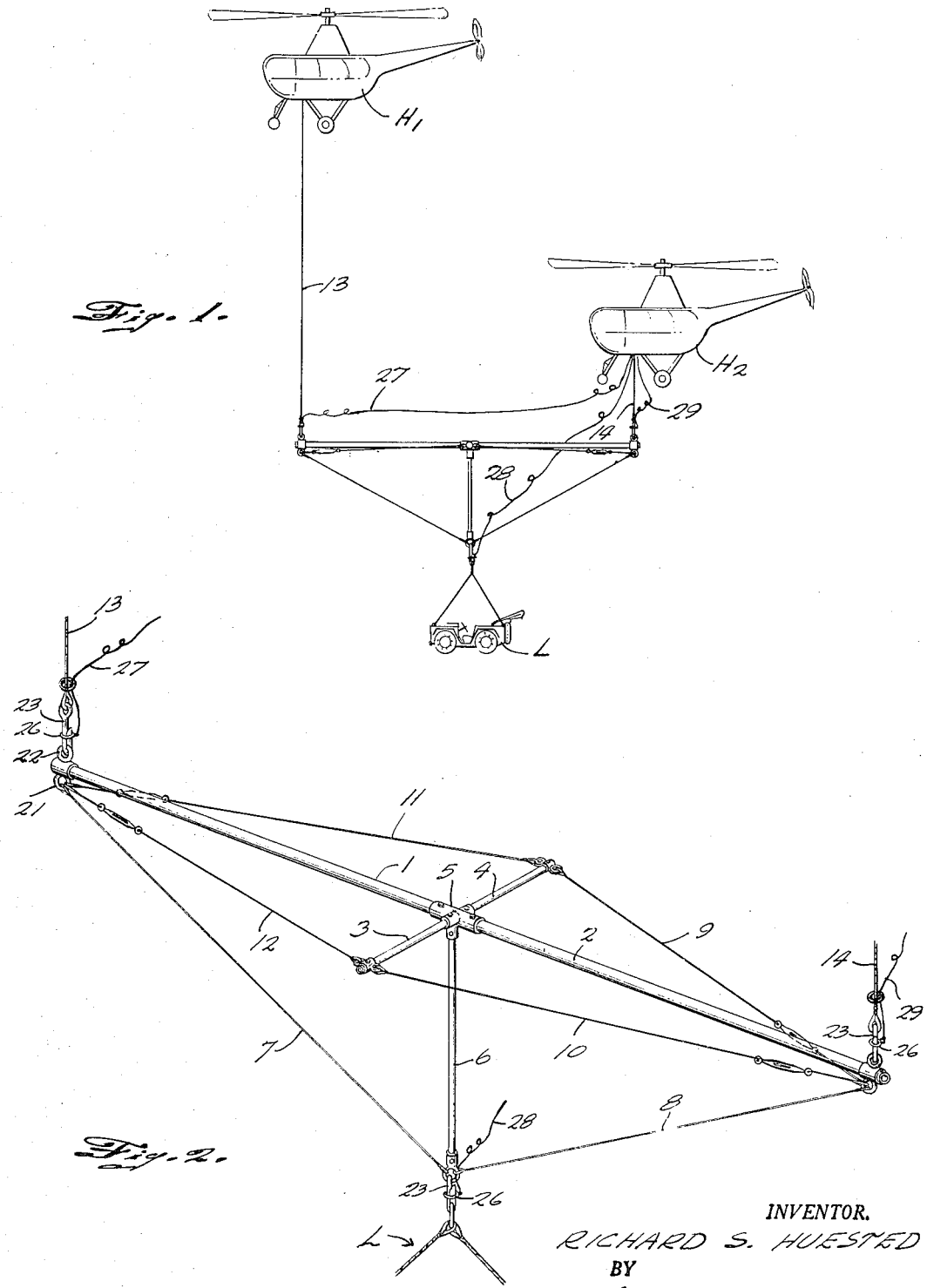

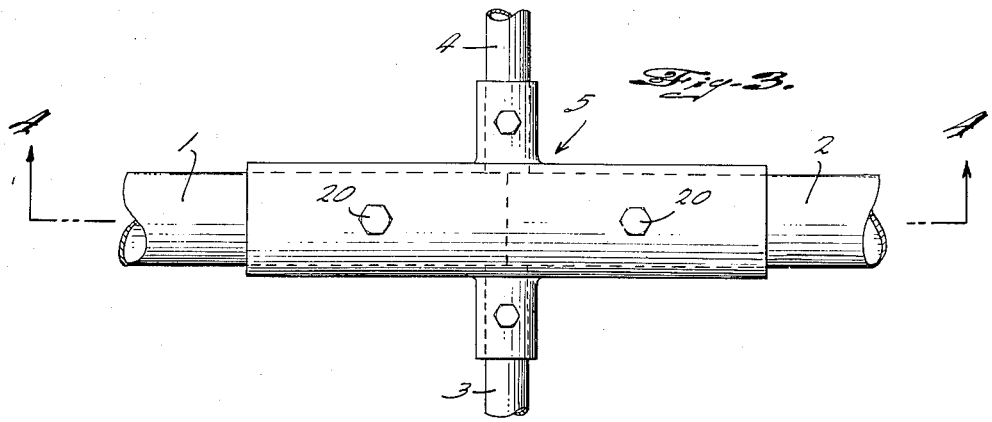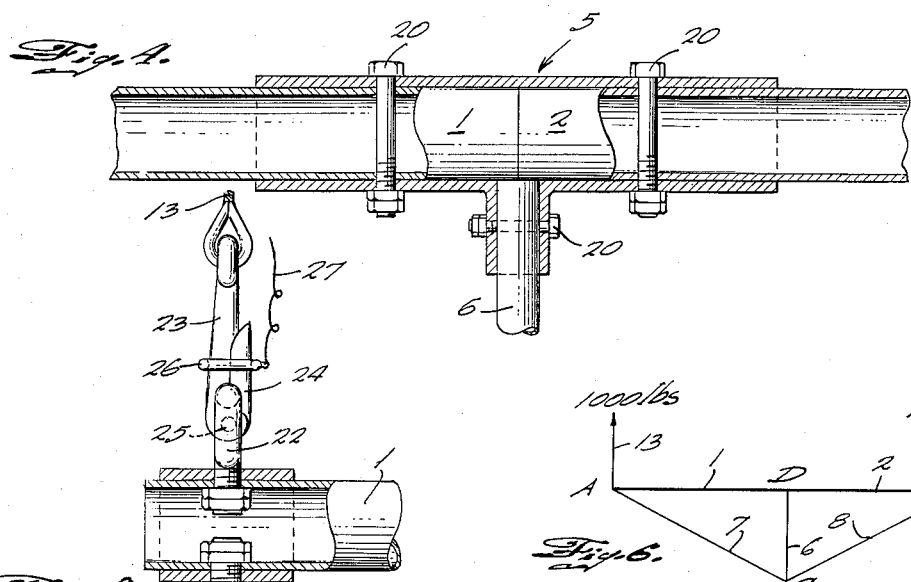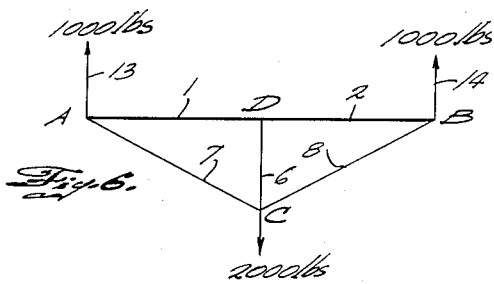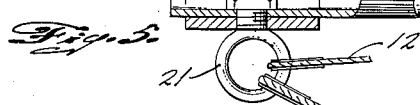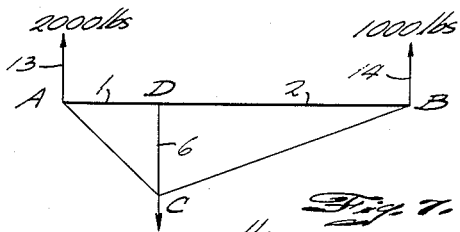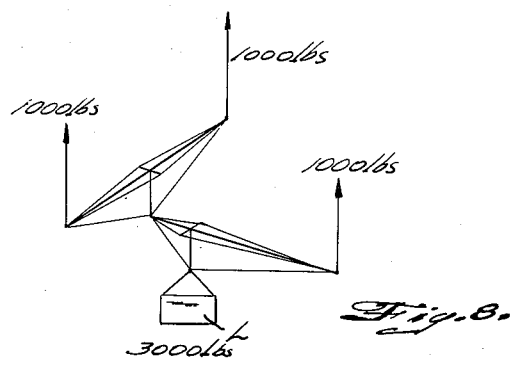
INVENTOR.
RICHARD S. HUESTED
BY
Sawyer & Kennedy
ATTORNEYS.

United States Patent Office 2,730,398
Patented Jan. 10, 1956

2,730,398
AIR LIFT DEVICES

Richard S. Huested, Englewood, N. J.

Application October 24, 1951, Serial No. 252,859

4 Claims. (Cl. 294—81)

This invention relates to improvements in air lift devices.

More particularly, the invention is concerned with providing a rig for permitting the lifting and transporting of loads by two or more helicopters, or other aircraft capable of hovering and of substantially vertical ascent and descent. This type of transportation is primarily desirable for large and bulky objects, such as vehicles, which cannot conveniently be disassembled for transportation by airplanes or other means, or where such transportation is not feasible by reason of the terrain and lack of take off and landing facilities.

It is an object of the invention to provide a rig for permitting the handling of a load by two or more helicopters acting in cooperation, so that greater loads than can be handled by one helicopter may be transported.

A further object of the invention is to provide a rig of the type indicated which knocks down for easy transportation.

With these and other objects which will appear in mind, a preferred form of the invention will now be described with reference to the accompanying drawing, and the features forming the invention will then be pointed out in the appended claims.

In the drawing:

Figure 1 is a schematic side elevation, showing a pair of helicopters lifting a vehicle by means of a rig embodying the invention in a preferred form;

Figure 2 is an isometric view of the rig of Figure 1;

Figure 3 is a detail plan view of a part of Figure 1;

Figure 4 is a section on the line 4—4 of Figure 3;

Figure 5 is a view partly in section of another detail of Figure 2;

Figures 6 and 7 are force diagrams; and

Figure 8 is a schematic isometric illustrating the cooperation of three helicopters for lifting a load.

Referring now to Figures 1 to 6, there is illustrated schematically a pair of helicopters H1 and H2 lifting a load L by means of a rig embodying the invention in a preferred form. The rig comprises a pair of spars 1 and 2, horizontal bracing struts 3 and 4 and a vertical bracing strut 6, all fixed in a central fitting 5, cables 7 and 8 running from the lower end of the vertical strut 6 and the outer ends of the spars 1 and 2 and guy wires or stays 9, 10, 11 and 12 running from the ends of the struts 3 and 4 to the ends of the spars 1 and 2, and cables 13 and 14 suspending the rig from the helicopters H1 and H2.

The general distribution of forces, as indicated in Figure 6, may be approximately as follows, assuming a 2,000 pound load. Tension in each of the cables 13 and 14 will be 1,000 pounds, tension in cables 7 and 8 will be approximately 2,250 pounds, and each of the spars 1 and 2 will be under 2,000 pounds compression. The struts 3, 4 and 6, which serve to brace the spar structure 1, 2 laterally, may be under varying forces from time to time. Under these conditions and allowing a safety factor of four to one, the main spars 1 and 2 may be, for example, four inch round steel tubing, fourteen gauge wall thickness and with other parts in proportion, the whole rig may weigh only about 250 pounds.

It will be noted that the rig is self-stabilizing, in the sense that if the upward pulls on the cables 13 and 14 are not equal, the consequent lifting at one end of the rig displaces the support point C toward that end, thus redistributing the load to produce a condition of balance.

Details of the center fitting 5 are shown in Figures 3 and 4. As there shown, this fitting is a tubular structure having five tubular projections for taking the spars and struts, which may be conveniently fastened in place by means of bolts 20. The bolts may fit somewhat loosely, so that the compressive force is communicated from the end of spar 2 to the end of spar 1 without putting any shearing stress upon the bolts.

The fittings at the ends of spars 1 and 2 may be the same, and the fitting at the end of spar 1 is shown in enlarged form and partly in section in Figure 5. As there indicated, a swivel ring 21 takes the stays 11 and 12 and also support cable 7, these elements being formed with eyes in any usual manner. An upper swivel ring 22 takes a supporting hook 23, which is advantageously formed as a quick release device, having a pivoted jaw or latch 24 swingable about a pin 25 in the hook 23 and held in the position of the figure by a retainer ring 26. Cord 27 for this retainer ring and similar cords 28 and 29 for retainer rings at points B and C may run up to the lower helicopter H2 permitting quick release at any or all of the three points as may be necessary.

The stays 9 to 12 are preferably provided with turnbuckles, as indicated, for taking up slack and adjusting tension of these members.

The total length of the rig from points A to B may be varied to suit particular conditions, but may be no more than about 20 feet. It will be apparent that when the spars and struts are disconnected the whole rig may be collapsed into a compact form, convenient for transportation in a helicopter or in any other desired way. The longer elements, such as the spars 1 and 2, may be made of varying wall thickness as desired for greater strength and may also be made in sections for a still more compact, knocked down unit, as required.

The angle between spars 1 and 2 and the cables 7 and 8 is preferably about 30°, as shown, but may also be varied within considerable limits.

The rig may also be constructed for use with three helicopters, for carrying larger loads, the dimensions being modified, as indicated in Figure 7, so as to elongate spar 2 as compared with spar 1, and repositioning the other parts correspondingly. In this case, a helicopter rig according to Figure 6 may be used for supporting a rig according to Figure 7 at point A, as indicated schematically in Figure 8.

For lifting still greater loads, four helicopters may be employed, a rig according to Figure 6 being utilized for supporting each of the points A and B of a similar rig.

It will be observed that with the rig of the invention, points A and B need be spaced apart only by sufficient distance so as to avoid interference with cable 13 by the blades of helicopter H2, as the load distribution does not depend upon the length of cables 13 and 14. The spars 1 and 2 may, therefore, be made relatively short, decreasing the strength and weight of the parts required very markedly.

As will be understood, the proportions and dimensions of parts will be varied according to the load distribution and loads to be carried as necessary, suitable proportions to suit given conditions being easily designed by conventional methods of stress analysis.

What is claimed is:

1. A rig for handling loads by means of a pair of helicopters comprising a horizontal spar, means for attaching cables at the ends thereof for lifting the same, a fitting for supporting a load, and lower suspending cables attached to the ends of the spar, extending downwardly therefrom at an angle and attached to the load supporting fitting.

2. A rig for lifting loads my means of a pair of helicopters comprising a horizontal spar, means for attaching cables at the ends thereof for lifting the same, a fitting for supporting a load, lower suspending cables attached to the ends of the spar, extending downwardly therefrom at an angle and attached to the load supporting fitting, and a vertical strut connecting the horizontal spar to the load supporting fitting.

3. A rig for lifting loads by means of a pair of helicopters comprising a horizontal spar, means for attaching cables at the ends thereof for lifting the same, a fitting for supporting a load, lower suspending cables attached to the ends of the spar, extending downwardly therefrom at an angle and attached to the load supporting fitting, a vertical strut connecting the horizontal spar to the load supporting fitting, horizontal struts connected to the horizontal spar at the point of attachment of the vertical strut, and guy wires connecting the ends of the horizontal spar to the ends of the horizontal struts.

4. A rig according to claim 3, in which the horizontal spar comprises two sections and a fitting attaching the same together in end to end relation and means attaching the said struts to the said fitting.

References Cited in the file of this patent

UNITED STATES PATENTS

| | | |
|---|---|---|
| 204,893 | Gibbons | June 18, 1878 |
| 624,077 | Patriarch | May 2, 1899 |
| 624,078 | Patriarch | May 2, 1899 |
| 808,161 | Lehmann | Dec. 26, 1905 |
| 1,007,663 | Atterbury | Nov. 7, 1911 |
| 1,135,338 | Vicsey | Apr. 13, 1915 |
| 1,181,784 | McCurry | May 2, 1916 |
| 1,812,955 | Horni | July 7, 1931 |
| 1,876,153 | Spurrier | Sept. 6, 1932 |
| 2,020,174 | Derossi | Nov. 5, 1935 |